Figure 1:

May 17, 1932.  J. T. BALDWIN  1,858,655
FLOOR COVERING
Filed Jan. 8, 1927

SATURATED FELT

SATURATED FABRIC

SATURATED FELT

SUPPORT

Inventor
Julian T. Baldwin.
By Prentiss, Stone & Boyden
Attorneys

Patented May 17, 1932

1,858,655

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

FLOOR COVERING

Application filed January 8, 1927. Serial No. 159,917.

This invention relates to an improvement in floor coverings and to a process of making the same.

Heretofore in the manufacture of floor coverings having a base of fibrous material, the latter was usually saturated with bitumen which presents an unsightly, inherently black appearance. In the present invention, however, fibrous materials such as rag felt, kraft paper, or textiles, are impregnated with a saturant, which may be practically any desired color, and which is believed to be more highly flexible under extreme conditions than saturants heretofore used, tougher, more durable, and less permeable. It is furthermore highly resistant to the alkalies and soaps used for cleaning purposes. These features constitute peculiar advantages inherent in the floor covering of this invention.

The saturant employed in the floor covering of the present invention is a so-called resin-plasticizer composition and consists generally of resins and plasticizers for the resins. Modifiers, colloidal substances, and solvents may be used with the resin and plasticizer composition if desired. This composition in comparison with other plastics, such as cellulose esters, for instance, is easier to apply, less expensive, less inflammable, and produces more striking effects.

The resins employed may be either natural or synthetic, examples of which are acroides gum, rosin, manila, copal, shellac, cumaron, ester gum, urea formaldehyde resins, and the like. Clear resins such as bleached shellac or water white rosin may be used. Rosin is easy to melt and easy to handle without danger of decomposition. It is to be understood that by resin is meant a true resin as technically distinguished from a gum. A true resin, for instance, is insoluble in water, whereas a gum is soluble in water.

Plasticizers are substances or mixtures of substances which apparently form a permanent gel or state of solution with resins. When a plasticizer is mixed with a resin, the resulting composition is generally considered to be a solution of the resin in the plasticizer, the plasticizer being the external phase. It is desirable in the present case to have the plasticizer as the internal phase or in solution in the resin. The solution is probably not a true solution but a gel or a dispersion of plasticizer in the resin, and it will be observed that one characteristic of this dispersion is that the amount of resin by weight far exceeds the amount of the plasticizer. This product of resin and plasticizer per se is claimed in my copending application Serial 138,897, filed October 1, 1926.

Plasticizers are generally liquid and have practically no vapor pressure at ordinary temperatures (70° F.). They are high boiling point solvents for resins, their boiling points ranging not much below 300° C.; they are chemically stable; free from tackiness; and impart to the resins the important properties of flexibility, toughness, impermeability, durability and smoothness of surface. Examples of plasticizers are: diethyl phthalate, dibutyl phthalate, diamyl phthalate, dibutyl tartrate, triphenyl phosphate, and tricresyl phosphate.

Modifiers are used optionally to attain certain qualities such as elasticity, hardness, stability toward light, and resistance to wear. They are also used as cheapeners. Examples of modifiers are: waxes (such as Montan wax), rubber, fatty acids of vegetable oils, polymerized oils, drying oils such as tung oil, and hydrocarbons such as spinacene and squalene. Cellulose ethers and cellulose esters may also be used.

The colloidal substances may be used to make an opaque, colored saturant. They add weight to the material saturated, and improve the wearing qualities of the material. The colloidal particles are fine, insoluble particles that exist in the saturant in such a fine state of division that they will penetrate into the fibrous material along with the saturant. They are practically ultramicroscopic in size. Examples of these substances are: zinc oxide, Prussian blue, carbon black, mica, and chrome yellow.

Dyes may be added to the saturant, or the fibrous base may be colored before saturating, in which case, if the saturant is a transparent resin-plasticizer composition, the color of the base will be visible through the saturant.

The use of volatile solvents is optional, depending upon the manner of applying the saturant. Examples of solvent are: ethyl alcohol preferably denatured, benzol, toluol, naphtha, and the like.

The fibrous material may have added to it in the process of its manufacture, mineral fillers or pigments. The fibrous material is generally treated in beaters with the pigments and fillers. The colloidal particles in the saturant will be an auxiliary supply of minerals and pigments. The base of the floor covering may be a fibrous material to which fillers and pigments have been added during the process of its manufacture, or it may be just a plain fibrous sheet.

The following is a general formula for a saturant:

| | Parts by weight |
|---|---|
| Resin | 100 |
| Plasticizer | 40 |
| Modifier | 10 |
| Colloidal particles | 20 |
| Solvent (if used) | 75–150 |

An example of a transparent, practically colorless saturant for use without solvent is the following:

| | Parts by weight |
|---|---|
| Water white rosin | 100 |
| Dibutyl phthalate | 25 |
| Diethyl phthalate | 15 |

To produce a transparent colored saturant, a dye may be added preferably by dissolving the dye in the plasticizers and adding the solution to the molten resins. To produce an opaque, colored saturant add 20 parts by weight of Prussian blue to the plasticizers in the above formula. The Prussian blue and plasticizers may be mixed in a colloid mill and the resulting mixture added to the resins which may be either molten or in solution. If a solvent is used, 75–150 parts by weight of denatured alcohol give satisfactory results.

The fibrous material may be saturated in the same manner in which felt is saturated with bitumen. The material may be run through a tank containing a heated resin-plasticizer saturant and then through squeeze rollers. The saturant may be applied cold when in solution and in this case the material is run through several times to completely fill the voids.

In floor coverings having fibrous bases, and upon which a design is to be printed, various colored saturants may be employed. In this case no backing is necessary. Furthermore, no protective coat is necessary between the base and the printed design since the resin-plasticizer saturant can be made to have a higher melting-point than the usual bitumen saturant and is much less miscible with the paint used for the design coat. The saturant may be of a neutral color, in which case, it can be readily covered.

A floor covering may be made from material saturated with a resin-plasticizer saturant, in the same manner that "straight line" linoleum is made. Pieces are cut from differently colored saturated fibrous materials, placed in position to form a design upon a support such as burlap or saturated felt, and fitted together in a solid piece by means of heat and pressure. Such a floor covering resembles inlaid linoleum in appearance.

A floor covering may be made by printing a design, with dyes or other suitable substances, upon or preferably completely through a fibrous material, and then saturating the colored fibrous material with a transparent resin-plasticizer saturant. The fibrous material thus treated may be used as a floor covering by itself or it may be cemented to a base such as linoleum or saturated felt.

Again, a floor covering may be made by forcing different colored resin-plasticizer saturants through the fibrous material in a manner to form a design. This may be done by applying the saturant under pressure through properly shaped orifices on one side of the fibrous material, and applying suction through similarly shaped orifices on the opposite side of the material. The saturant is thus forced into the material in such a way as to form a complete design. The resulting product may be used by itself or as a wear or decorative layer upon a felt, linoleum, or other base.

Figure 2:
Figure 3:

The accompanying drawings illustrate diagrammatically the application of the above described saturant. Fig. 1 is a cross section of a matted fibrous material which is saturated throughout with the saturant. Fig. 2 is a cross section of a woven fabric impregnated with the saturant. Fig. 3 is a cross section of a floor covering in which a matted fabric 1, saturated with a resin-plasticizer composition, is cemented to any suitable support 2 which may be impregnated with any suitable saturant.

A decided advantage of a resin-plasticizer saturant over bitumen is that bitumen saturants are black and opaque, while resin-plasticizer saturants may be transparent and colorless, transparent and colored, or opaque and colored.

Resin-plasticizer saturants are more desirable than cellulose esters for a number of reasons. Resin-plasticizer compositions are less inflammable than cellulose esters. They are very much cheaper, and are easier to apply since a resin-plasticizer may be rendered fluid with heat and used without the use of solvents, while cellulose esters are not rendered sufficiently fluid by heat to make satisfactory saturants.

Since a resin-plasticizer composition with the use of heat may be used without the use of solvents, the voids in the fibrous material are filled by fewer treatments than where cellulose ester solutions are employed. In the case of resin-plasticizers all of the composition will remain in the voids whereas in the case of cellulose ester solutions where only 10 to 30% is solid matter, the voids are not as quickly filled and therefore more treatments are necessary. Even in the case of resin-plasticizer solutions where 40 to 70% or more is solid matter, fewer treatments are required, and there is incidentally a saving in the cost of solvents. When solvents are used, a much higher concentration of resin may be obtained than with pyroxylin for the same viscosity. The concentration of solids in a resin solution may often be ten times as great as in a cellulose ester solution of lower viscosities.

Cheaper solvents can be used with resins than with cellulose esters. Solvent naphtha, benzol, and 188 proof denatured alcohol are the most important resin solvents. Esters, which are many more times expensive, are quite necessary for the dissolving of cellulose esters. Expensive slow evaporating solvents need not be used with resins.

A saturant that can be used hot, as in the case of resin-plasticizer saturant, penetrates a fibrous material more readily than a cold saturant. The heat expands the air in the voids and tends to drive it out. When the material is cooled after saturation, a suction is created and upon retreatment the material absorbs the saturant more readily, thereby filling all the remaining voids.

The resin plasticizer material described in this invention as the saturant of a sheet is also described and claimed as a coating material in my copending applications, Serial 138,897 filed October 1, 1926, Serial 145,002 filed October 29, 1926 and Serial 145,003 filed October 29, 1926.

What I claim is:—

1. A floor covering comprising a sheet of fibrous material impregnated with a saturant having as its two major ingredients a resin and a substantially chemically stable plasticizer for the resin, the surface of said impregnated base being free from tackiness under ordinary conditions of floor covering usage.

2. A floor covering comprising a base of fibrous material and which base has been impregnated with a saturant containing the following materials and proportions: 100 parts by weight of resin, 25 parts by weight of dibutyl phthalate, and 15 parts by weight of diethyl phthalate.

3. A floor covering comprising a fibrous base, said base being impregnated with a composition having as its two essential ingredients a resin and a dispersion of a substantially chemically stable plasticizer in the resin, the proportions being substantially 40 parts of plasticizer to each 100 parts of resin, and said impregnated sheet being free from tackiness under floor covering usage.

4. The floor covering comprising a sheet of fibrous material impregnated with a saturant having as its two major ingredients a resin and a substantially chemically stable plasticizer for the resin, and which plasticizer is selected from the following: dibutyl phthalate, diamyl phthalate, dibutyl tartrate, triphenyl phosphate, and tricresyl phosphate.

5. A floor covering comprising a sheet of fibrous material impregnated with a saturant having as its two major ingredients a resin and a substantially chemically stable plasticizer for the resin, which saturant prior to application to the sheet is susceptible to being rendered fluid by heat without deterioration and solidifies upon cooling.

In testimony whereof I affix my signature.

JULIAN T. BALDWIN.